June 5, 1962  R. S. KAFKA  3,037,598
ONE-REVOLUTION CLUTCH
Filed July 5, 1957  5 Sheets-Sheet 1

INVENTOR
ROBERT S. KAFKA
BY Bauer and Seymour
ATTORNEYS

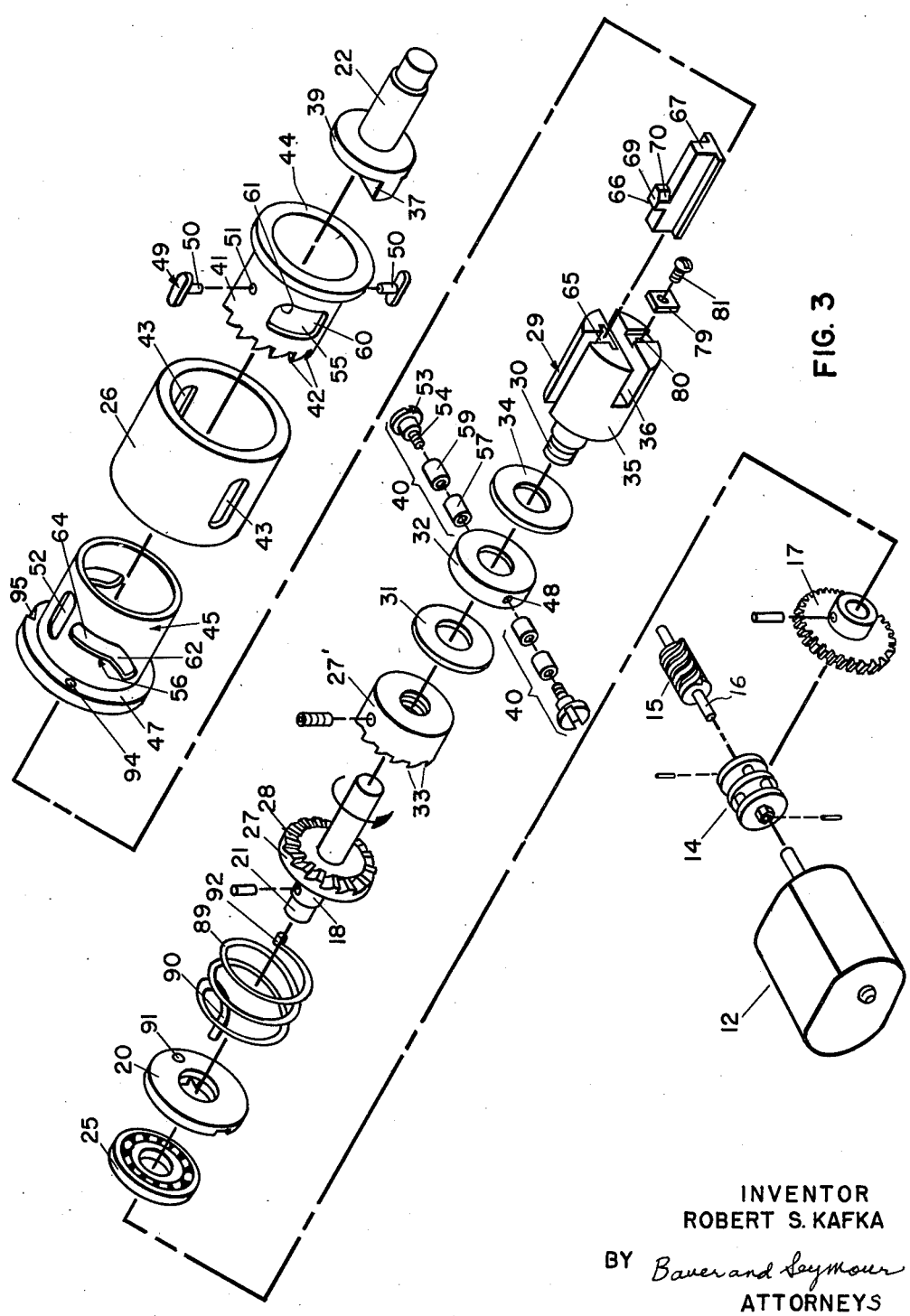

June 5, 1962  R. S. KAFKA  3,037,598
ONE-REVOLUTION CLUTCH

Filed July 5, 1957  5 Sheets-Sheet 3

INVENTOR
ROBERT S. KAFKA

BY Bauer and Seymour
ATTORNEYS

INVENTOR
ROBERT S. KAFKA
BY Bauer and Seymour
ATTORNEYS

June 5, 1962 R. S. KAFKA 3,037,598
ONE-REVOLUTION CLUTCH
Filed July 5, 1957 5 Sheets-Sheet 5

INVENTOR
ROBERT S. KAFKA
BY Bauer and Seymour
ATTORNEYS

United States Patent Office
3,037,598
Patented June 5, 1962

3,037,598
ONE-REVOLUTION CLUTCH
Robert Stickney Kafka, Port Washington, N.Y., assignor to Tickamatic Corporation, Port Washington, N.Y., a corporation of New York
Filed July 5, 1957, Ser. No. 670,055
18 Claims. (Cl. 192—24)

This invention relates to an improved clutch of the definite-position release type.

The invention has among its objects the provision of a novel improved clutch which breaks the power drive therethrough after a predetermined angular movement of the driven element thereof.

A further object of the invention resides in the provision of a definite-position release type clutch wherein the release of the clutch parts is positively effected by power derived from the driving element of the clutch.

Yet another object of the invention lies in the provision of a clutch of the type indicated wherein the means for releasing the drive of the clutch is controlled by a selectively operated manual device, whereby the clutch may be operated either as a definite-position release clutch or a manually operated on-off type of clutch.

Still another object of the invention is the provision of a definite-position release clutch which releases its load at an accurate predetermined angular position, regardless of the load and/or the friction in the driven parts of the clutch and the mechanism driven by the clutch.

The above and further objects and novel features of the invention will more fully appear from the following detailed description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views, FIG. 1 is a view in plan of the clutch and of a driving mechanism therefor;

FIG. 3 is an exploded view in perspective of the main elements of the clutch;

Figure 8:
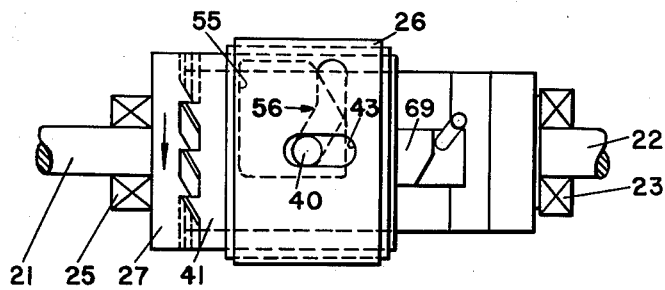
Figure 9:
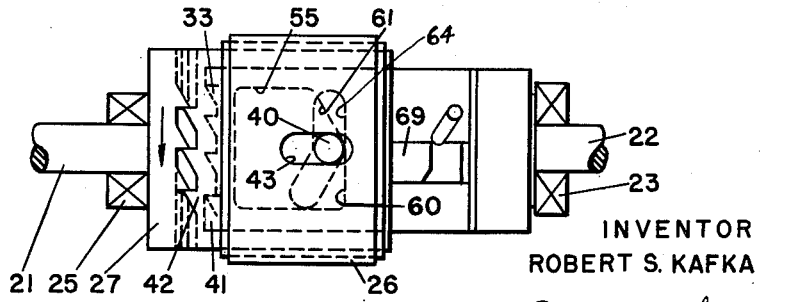

FIGS. 6, 7, 8, and 9 are fragmentary somewhat schematic views in side elevation of the main parts of the clutch, such views respectively showing the relative positions of the main parts of the clutch in a condition in which the drive through the clutch is completely disengaged (FIG. 6), a condition in which the driving element and main driven element are operatively engaged (FIG. 7), the position of the parts at the beginning of a definite-position clutch-releasing cycle (FIG. 8), and the position of the parts intermediate such cycle (FIG. 9).

Figure 1:
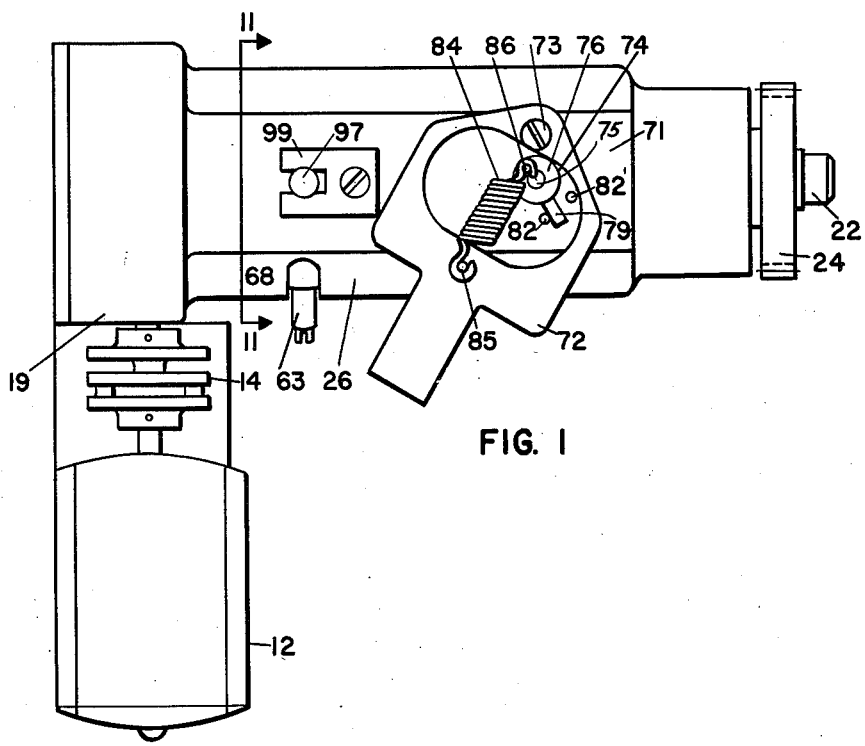
Figure 2:
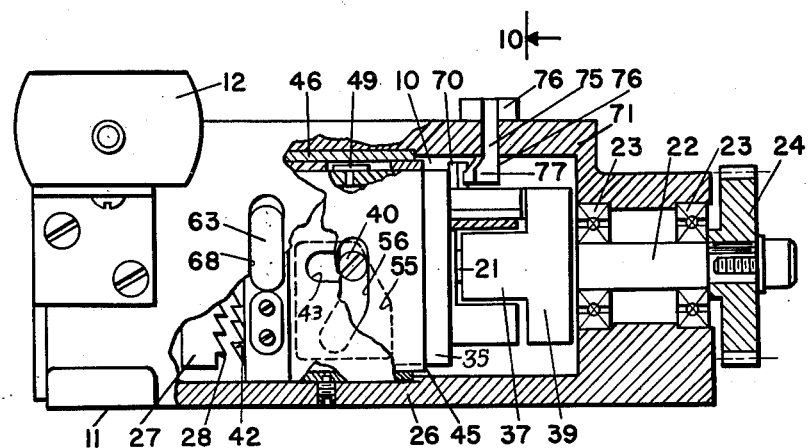
FIG. 2 is a view in side elevation of a clutch with the parts thereof in clutch-disengaged position, certain parts of the clutch being shown in section, the view being taken from the side of the clutch having the manually operated clutch-shifting control element, a portion of the clutch-tripping mechanism at the top thereof in FIG. 1 being omitted in FIG. 2.
Figure 5:
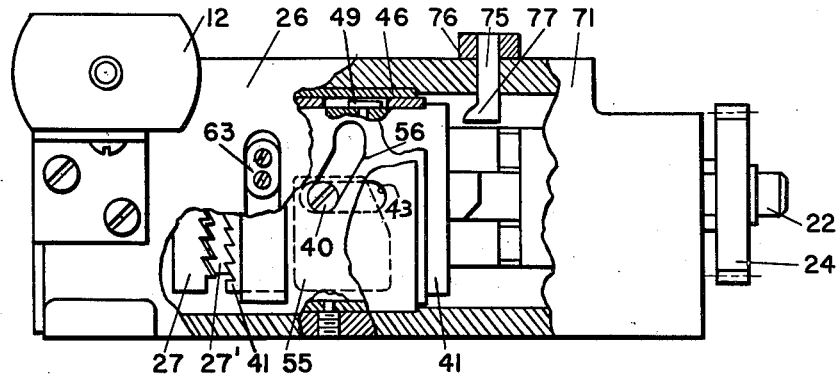
FIG. 5 is a view similar to FIG. 4, but with the teeth of the clutch-disengaging sleeve in mesh with the teeth on the driving clutch element, and with the teeth on the main driven element disengaged from the teeth on the driving element.
Figure 4:
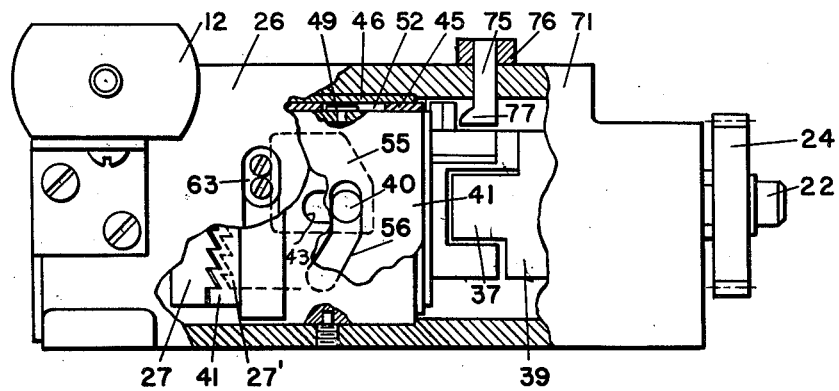
FIG. 4 is a view of the clutch similar to FIG. 2, but with the driving and driven members of the clutch drivingly engaged and the clutch-releasing sleeve retracted into inoperative position.
Figure 10:
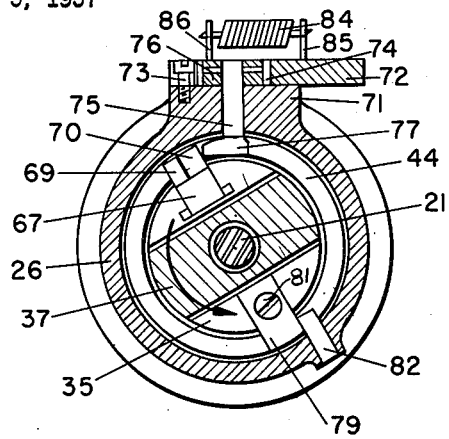
Figure 11:
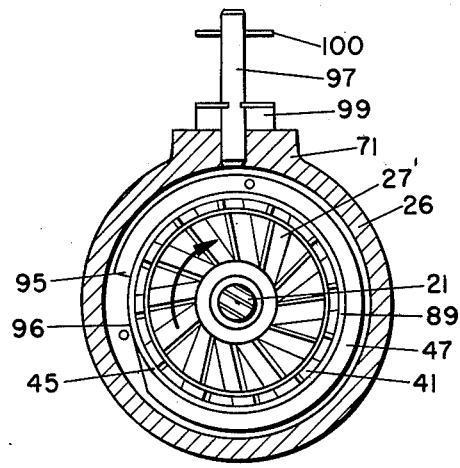
Figure 12:
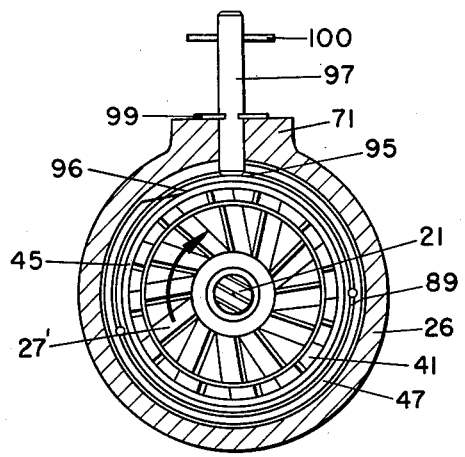

FIG. 10 is a view in transverse section through the clutch showing the manner of interaction of the tripper dog and the slide for actuating the clutch-disengaging sleeve, the section being taken generally along line 10—10 of FIG. 2;

FIG. 11 is a view in transverse section through the clutch showing the torsion spring which powers the clutch-engaging sleeve into clutch-engaging position and the latch for the clutch-engaging sleeve, the section being taken generally along line 11—11 of FIG. 1, the parts being shown in clutch-engaging position; and FIG. 12 is a view similar to FIG. 11, but with the parts in clutch-released position.

The embodiment of the clutch illustrated in the accompanying drawings, by way of example, is useful as a part of a ticket printing and dispensing device, such as shown in my U.S. Patent No. 2,794,391, dated June 4, 1957. In such use of the clutch, it is called upon to drive a shaft successively through one revolution in each cycle of its operation. It is desirable that the driven element be rotated through an accurately predetermined arc, in order that the driven parts of the apparatus shall start and stop at the same place in each cycle. In the embodiment shown, the clutch is of such construction that in one position of its control means the drive through the clutch is released after the driven element has been rotated through 360°. It will be understood, however, that clutches in accordance with the invention may be made so as to release the drive therethrough after the driven element has been rotated through angles other than 360°

Prior definite-position release type clutches have derived the power required to move the clutch elements from engagement, thereby to release the drive therethrough, from the driven element of the clutch. Because of this, disengagement between the elements of the clutch, at least in the latter portion of the disengaging cycle, tended to be impositive, the finally released position of the driven element depending to an appreciable extent upon the momentum of the load connected thereto and upon the frictional forces acting upon the driven elements of the clutch and upon the apparatus constituting the load.

The clutch in accordance with the present invention, as will be seen from the detailed description hereinafter, effects disengagement of the drive therethrough by power derived from the driving element of the clutch, thereby insuring final disengagement of the driving and driven elements of the clutch at an angular position which is independent of the load and of the described frictional forces.

Turning now to the drawings, an embodiment of the clutch of the invention, generally designated 10, is shown mounted on a supporting structure 11. The clutch there shown forms an element in the driving train between a motor 12 and a gear 24 which, for example, is designed to actuate the slide of the ticket printing and dispensing apparatus disclosed and claimed in the above referred to U.S. Patent No. 2,794,391. A shaft 16 is connected to the drive shaft of motor 12 by a flexible coupling 14. Shaft 16 is supported in bearings, as shown, in part 19 of the housing, and carries a worm 15 meshing with a worm gear 17 which is keyed to a shaft 21 connected to a first, driving or driver element 27 of the clutch.

A bearing cage is mounted upon supporting structure 11 at the left in FIG. 2. Such cage contains a radial bearing 25 capable of taking thrust which journals therewithin a sleeve portion 18 of the driver element 27 of the clutch. Pinned to element 27 and extending axially therethrough is a shaft 21 to which worm gear 17 is keyed. Clutch element 27 carries on its inner face a plurality of similar equal angularly spaced saw-toothed shaped clutch teeth 28. Such clutch teeth cooperate with similar teeth on driven clutch element 27' and on clutch-disengaging sleeve 41. Parts 27, 27', and 41 are disposed about the inwardly projecting end of shaft 21 and are contained with a circular cylindrical clutch housing 26. A driven shaft 22, carrying a gear 24 on its outer end, is journalled in bearings 23 within a reduced diameter extension of clutch housing 26. Gear 24 is a part of the mechanism (not a part of the invention) driven by the clutch. Shaft 22 is drivingly connected to driven clutch element 27' in a manner to be described.

Upon considering FIG. 2, particularly with the aid of the exploded view of FIG. 3, it will be seen that a first or inner sleeve, generally designated 29, which carries bearing bushings (not shown) therewithin, rotatably engages the inner end of shaft 21. Sleeve 29 has a reduced diameter threaded end 30 (at the left in FIG. 3) which is screwed into the internally threaded end of annular member 27'. Member 27' is provided on its left end (FIGS. 2, 3, 4, and 5) with a series of teeth 33 similar to and adapted to mesh with teeth 28 of element 27. The composite element formed of members 29 and 27' may be shifted longitudinally of shaft 21 selectively to mesh and disengage teeth 28 and 33. Shifting of such member is effected by means, to be described, including a shifting sleeve or collar 32, which is rotatably positioned on the threaded end 30 of sleeve 29, between thrust washers 31 and 34, in an annular seat formed between the end of element 27' and the body 35 of element 29.

As shown most clearly in FIG. 3, the rear end of the body 35 of member 29 is provided with a large centrally located transverse slot 36, and the inner end of driven shaft 22 has an enlarged head 39 rotatably mounted in housing 26. Head 39 carries a squared centrally located tang 37 which slidingly fits within slot 36, the tang and slot maintaining driving relationship between member 29 and shaft 22 while allowing member 29 to be shifted longitudinally within the clutch housing. Such shifting of the element or spool 29 is effected by a pair of shifting pins, generally designated 40, which project diametrically oppositely from shifting collar 32 and which interact, in a manner to be explained, with the clutch-releasing sleeve 41, a clutch-operating sleeve 45, and the housing 26.

Clutch-releasing sleeve 41 has a series of teeth 42 on the end thereof confronting the driver element 27, teeth 42 being adapted selectively to mesh with teeth 28 on such latter element. Sleeve 41 has a flange 44 on the rear end thereof, such flange being engageable by a selectively operated slide member 66 which thrusts sleeve 41 to the left (FIG. 3) into operative driving relationship with driver element 27. A clutch-operating sleeve 45 is disposed about around sleeve 41 and is keyed thereto by key members 49 having stems 50 received in holes 51 in sleeve 41 and elongated heads slidingly received in elongated axially extending slots 52 in the wall of sleeve 45. The inner wall of housing 26 is provided with an inner sleeve 46 fixedly mounted therein, such inner sleeve serving as a bearing for the composite assembly made up of elements 29, 32, 41, and 45.

Pins 40, as more clearly shown in FIG. 3, are each made up of a stud 53 each having an inner threaded end 54 threadedly received in an opening 48 in the collar 32, and two similar aligned rollers 57 and 59 rotatably mounted on the unthreaded shank of pin 53. Rollers 57 and 59 of each of the two pins 40 serve as cam followers for cooperation, respectively, with cam surfaces in the form of oppositely disposed similar cam slots 56 in sleeve 45, and of corners 61 of oppositely disposed windows 55 in clutch-releasing sleeve 41. The outer ends of pins 40 slide in generally axially disposed slots 43 in housing 26.

Figure 6:
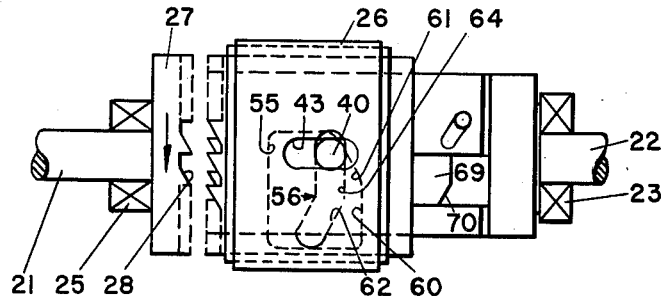
Figure 7:
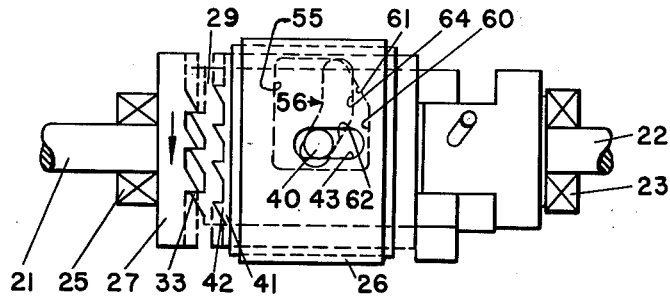

The configuration of windows 55 and their axial length and peripheral width relative to sleeve 41 and the other elements of the clutch will be understood more fully upon consideration of FIGS. 6 to 9, inclusive. Each window 55 is generally in the form of a rectangle projected upon the cylinder surface of sleeve 41, the window 55 having a rear peripherally extending (vertical in FIGS. 6 to 9) edge 60 of a peripheral length which is illustrated as being generally one-half the peripheral width of the window. From the upper end of edge 60 the window slants toward driver element 27 to form an inclined edge or cam surface 61. Inclined edge 61 is so located that, when sleeve 41 is fully retracted from driver element 27 as shown in FIG. 6, pin 40 contacts edge 61 adjacent the upper (FIG. 6) end of such edge. As above noted, pins 40 can move only axially of the clutch, by reason of engagement of their outer ends in slots 43 in housing 26.

Each of cam slots 56 in sleeve 45 has a first track portion 62 which inclines away from driver element 27 in a direction opposite from the direction of inclination of edge surface 61 of window 55. Such inclined track portion extends peripherally within sleeve 45 for a distance which is generally one-half the total peripheral extent of cam slot 56 and of window 55. Connected to the upper (FIGS. 6 to 9) end of inclined portion 62 of the slot is a straight, peripherally extending portion 64. Cam track 56 is so related to the window 55 that when the teeth on both the driven element 27' and on sleeve 41 are retracted from the teeth on driver element 27, as shown in FIG. 6, the pin 40 lies adjacent the upper closed end of straight portion 64 of the cam track 56, and that when both elements 27' and 41 are operatively engaged with driver element 27, as shown in FIG. 8, the pin lies adjacent the lower closed end of inclined cam track portion 62. Preferably, as shown, cam track 56 and window 55 are of such configuration and size relative to each other that the pin 40 is locked against axial travel by portion 64 of the cam track before inclined edge 61 of the window begins to cooperate with the pin to retract sleeve 41.

Disregarding for the moment the definite-position releasing aspects of the clutch, it will be seen that the driving connection through the clutch may be selectively effected and broken by shifting driven element 27' toward and away from driver element 27, respectively. To allow such operation, there is provided a finger 63 which projects through a peripherally extending slot 68 in housing 26 and is connected to sleeve 45, as by having its inner end screwed thereinto. It will be apparent that, when finger 63 is shifted into its upper position, sleeve 45 is turned to move driven element 27' into meshing driving relationship with driver 27, and that when finger 63 is moved to the lower end of slot 68, sleeve 45 is turned in the opposite direction to move driving element 27' away from driver element 27, thereby to break the drive through the clutch. During such manual on-off operation of the clutch, in which the driven element may be rotated through any desired number of revolutions, sleeve 41 remains inoperative, that is, in the retracted position of FIG. 6. To permit such "on-off" operation of the clutch shown, latch pin 97, to be described, is held in retracted inoperative position.

Sleeve 41, when it is shifted to the left (FIG. 8), operates to derive power from element 27 to break the driving connection through the clutch after a predetermined angular movement of the driver element (one revolution in the embodiment of the clutch shown). To cause the clutch to operate in such manner, sleeve 41 is shifted into engagement with driver element 27 at a predetermined point intermediate the ends of the desired angular motion of the driver element, following which pins 40, cam tracks 56, and windows 55 cooperate first to retract the driven element 27' to inoperative position as shown in FIG. 9, following which edge 61 of window 55 acts upon pin 40 so that continued rotation of sleeve 41 by driver element 27 causes the teeth 42 on sleeve 41 to be disengaged from teeth 28 on driver element 27, thus to return sleeve 41 to the retracted position shown in FIG. 6.

Sleeve 41 is shifted into the operative, meshing, position of FIG. 8 by means of the selectively operated slider 66. Such slider has a dove-tail-shaped elongated body 67 slidably received in a dove-tailed guideway 65 extending longitudinally of sleeve element 29 of the clutch. Slider 66 thus rotates with element 29. Projecting radially from slider 66 is a lug or finger 69 having edge 70, which leads during rotation of element 29, beveled or slanted as shown. Lug 69 has its inner (left in FIG. 3) edge in thrusting relationship with the other end surface of flange 44 on sleeve 41, so that when slider 66 is thrust toward the driver element 27 it carries sleeve 41 with it.

A dog 77 mounted on housing 26 is selectively interposable into the path of rotation of lug 69, the parts being so dimensioned and arranged that when the dog is in operative position it is contacted by surface 70 on lug 69, as the lug rotates past the dog, and thus thrusts sleeve 41 into meshing engagement with driver element 27.

The manner in which tripper dog 77 is mounted and operated will be understood upon consideration of FIGS. 1, 2, and 10. Housing 26 has a centrally located elongated boss 71 extending along the top thereof. Near the rear of housing 26 there is pivotally attached to boss 71 by pin 73 a lever 72 which rests upon the flat upper surface of the boss. Lever 72 has an arcuate slot 74 therein freely receiving a collar 76 which is pinned to tripper shaft 75. Shaft 75 is rotatably mounted in a central bore in boss 71, and carries tripper dog 77 on its inner end.

Dog 77 is eccentrically located on shaft 75, and has its free end so disposed that when shaft 75 is turned to one terminal position, by means to be described, lug 69 in its axial outward, inoperative position clears dog 77 as it rotates therepast, and so that when shaft 75 and dog 77 are turned to their other terminal position, shown in FIGS. 1, 2, and 10, surface 70 on lug 69 contacts dog 77 as the tripper slide 66 rotates therepast, thereby to thrust slider 66 and clutch-disengaging sleeve 41 into meshing engagement with driver element 27.

Dog 77 is turned from one terminal position to the other, as desired, by the shifting of lever 72 about pin 73. A coil tension spring 84 is secured between pin 85 on lever 72 and pin 86, eccentrically positioned on collar 76. The pins 85, 86 are so located as to extend or load the spring 84 intermediate the range of swinging of lever 72, the collar 76 snapping into stably held position at each terminus of swinging of lever 72. One such terminus is provided by a pin 82 on housing 26 which serves as a stop for a transverse pin 79 on shaft 75; the other terminus is provided by another pin 82', likewise mounted on housing 26, which stops pin 79 in its other terminal position. Such mechanism not only provides dog 77 with a fast "trigger" action in moving from operative to inoperative position, and vice versa, but also cushions the dog 77 against the shock of engagement with lug 69. Further, such arrangement provides a safety feature in that the dog will automatically be swung to inoperative position should the lug 69 of tripper slide 66 in some manner project too far axially outwardly to permit cam surface 70 on the lug properly to cooperate with the dog.

It is desirable, particularly in precision machinery where the desired angular motion of the driver element at each cycle must be exact, to provide a braking means for the driven element. Where the driven parts are small and light, so that their inertia is not great, it is preferable to employ rigid cooperating stop members for this purpose. In the embodiment shown a radially projecting finger 79 is secured in a shallow groove 80 on the end of body 29 by a machine screw 81. A shoulder cooperating with finger 79 is fixed to housing 26 at such position peripherally thereof that finger 79 abuts the shoulder to bring element 29 to a complete stop at a predetermined position after the power connection has been broken through the clutch.

In the embodiment shown, such shoulder takes the form of an inwardly projecting pin 82 affixed to the clutch housing 26 (FIG. 10). The parts are so arranged relative to the length of the path through which element 29 is shifted axially to initiate a new driving cycle, finger 79 will clear pin 82, thus to allow element 29 to rotate. In some instances, particularly where the driven elements are of appreciable size and have a large inertia, it is prefer-able to employ, instead of stop finger 79 and pin 82, cooperating friction surfaces on the element 29 and the clutch housing to bring element 29 to a stop at a substantially definite and accurate angular position.

In the clutch shown, means is provided for biasing sleeve 45 toward clutch-engaging position, thereby to make its use as a definite-position release clutch faster and more positive in action. Such biasing means takes the form of a torsion spring 89 having a tang 90 at one end thereof received in a hole 91 in member 20, which is normally held fixedly on frame 11. The other end of the spring bears a tang 92 which projects into a hole 94 on the flange 47 on sleeve 45. The initial position of spring 89 may be adjusted by loosening the means retaining member 20 on the housing of the clutch, turning member 20 to tighten or loosen the spring the desired amount, and then securing member 20 in such adjusted position. Torsion spring 89 is so arranged that it is wound up when sleeves 41 and 45 are in the clutch-releasing position, in which they are held by a releasable latch, to be described. When the latch is released, spring 89 quickly and positively turns sleeves 41 and 45 to clutch-engaging position.

The latch means is shown most clearly in FIGS. 11 and 12. Flange 47 on sleeve 45 has a cut-away portion in one zone thereof having a radial shoulder 95 and a sloping ramp 96 leading away from the shoulder. A vertical pin 97 is reciprocably mounted in a vertical hole in boss 71 in alignment with flange 47 on sleeve 45. A leaf spring 99 having one end connected to boss 71 and the other end secured to pin 97, as shown, constantly urges pin 97 downwardly. A cross pin 100 on pin 97 may be connected to operating means (not shown) whereby the pin 97 is retracted to initiate each operating cycle of the clutch. After completion of each cycle the unit comprising sleeves 41 and 45 will have been turned clockwise (FIG. 12) so that the shoulder 95 just clears the inner end of pin 97, whereby such pin drops onto the ramp 96 and locks the unit against counter-clockwise rotation, in which the parts are in clutch-releasing position.

It is believed that the mode of operation of the clutch will be understood from the above description. However, it will be well briefly to trace the operation of the clutch through a clutch-engaging-and-releasing cycle.

The cycle starts with the driven element composed of parts 27', 29 (FIG. 3) at rest with the part 35 in the angular position shown in FIG. 10, with stop finger 79 engaging stop pin 82, and with latch pin 97 engaging shoulder 95 and thus locking the unit made up of sleeves 41 and 45 in its "clutch-released" position. Driven element 27' and sleeve 41 are thus held in the position of FIG. 6, retracted from engagement with driver element 27.

The cycle is started by retracting pin 97 to clear shoulder 95. Spring 89 then impels the unit made up of sleeves 41 and 45 counterclockwise (FIGS. 11 and 12) so that driven element 27' is thrust axially to cause stop finger 79 to clear stop pin 82 and to cause element 27' to move into engagement (FIG. 7) with the rotating driver element 27 by the interaction of pins 40 and cam tracks 56 in sleeve 45. Driven element 27', 29 then is positively rotated by driver element, carrying with it slider 66, mounted on body 29. When slider 66 reaches the position of dog 77 in its counterclockwise travel (FIG. 10) dog 77 engages lug 69 on the slider to thrust sleeve 41 into meshing engagement with driver element 27, as shown in FIG. 8. Driver element 27 thus drives all of elements 27', 29 and 41 through a first relatively small angle, and then, after disengagement of teeth 28 and 42, drives sleeve 41 through a second relatively small angle.

At the end of the first small angle the inclined portion 62 of cam track 56 will have moved element 27' out of mesh with driver element 27 (FIG. 9). Thereafter driver element 27 continues drivingly to rotate sleeve 41 throughout the second small angle, during which the interaction of pins 40 and inclined edges 64 of windows 55 in sleeve 41 causes the retraction of sleeve 41 from driving engagement with driver element 27. During both of such successive small angular movements of the unit made up of sleeves 41 and 45 the torsion spring 89 is wound up. The inner end of latch pin 97 snaps inwardly to engage shoulder 95 just before sleeve 41 is released from driving engagement with driver element 27.

The advantages of the clutch of the invention will be manifest from the above description. The clutch is compact and rugged, thus operating for long periods of time without attention. The clutch lends itself admirably to being sealed with a supply of lubricating oil therein. This is particularly true when finger 63 and slot 68 are omitted, although such parts may, when used, be provided with a single oil-tight seal therebetween.

Although only one embodiment of the present invention has been illustrated in the accompanying drawings and described in the foregoing specification, it is to be understood that said invention is not limited to said embodiment or to the particular use of the clutch disclosed. Various changes may be made therein, particularly in the design and arrangement of the parts illustrated without departing from the spirit and scope of the invention as will now be clear to those skilled in the art.

What is claimed is:

1. A definite-position release type clutch, comprising: a toothed driver element, a toothed driven element adapted to be selectively shifted into and out of meshing engagement with the driver element, means for shifting the driven element into engagement with the driver element, and clutch-releasing means comprising a rotatable member mounted parallel to the axis of the driven element and reciprocable along its axis of rotation so as to be selectively drivingly engageable with the driver element, and means driven by the rotatable member to shift the driven element out of meshing engagement with the driver element.

2. A definite-position release type clutch, comprising: a toother driver element, a toothed driven element coaxial of the driver element and adapted to be selectively shifted into and out of meshing engagement with the driver element, means for shifting the driven element into engagement with the driver element, and clutch-releasing means comprising a rotatable toothed member mounted parallel to the axis of the driven element, said rotatable toothed member being reciprocable along its axis of rotation so as to be selectively drivingly engageable with the teeth of the driver element, and means driven by the rotatable toothed member to shift the driven element out of meshing engagement with the driver element.

3. A definite-position release type clutch as claimed in claim 1, wherein the clutch-releasing means is selectively drivingly engageable with the driver element to shift the driven element out of meshing engagement with the driver element, and comprising means for thereafter automatically retracting the clutch-releasing means from the driver element.

4. A definite-position release type clutch as claimed in claim 3, comprising power-storing spring means into which power is fed during the clutch-releasing operation, and latch means to hold the means for shifting the driven element in inoperative, retracted position out of meshing engagement with the driver element, the spring means, when released, moving the shifting means to thrust the driven element into engagement with the driver element.

5. A definite-position release type clutch as claimed in claim 4, in which the power-storing means is a torsion spring, and wherein the clutch includes a latch means which selectively retains the outer sleeve in retracted, clutch-released position.

6. A clutch as claimed in claim 5, comprising a stop means which is operative when the driven element is retracted from the driving element to stop the driven element in a predetermined angular position.

7. A definite-position release type clutch, comprising: a toothed driver element, a toothed driven element adapted to be selectively shifted into and out of meshing engagement with the driver element, a first means for shifting the driven element into and out of engagement with the driver element, clutch-releasing means selectively drivingly engageable with the driver element to shift the driven element out of meshing engagement with the driver element, and a second means for shifting the clutch-releasing means into meshing engagement with the driver element.

8. A clutch as claimed in claim 7, comprising means connected to the clutch-releasing means which operates, upon the shifting of the clutch-releasing means into engagement with the driver element, to urge the first means toward the position in which it disengages the driven element from the driver element.

9. A clutch as claimed in claim 8, wherein the first manually operated means comprises a cam follower rotatably and non-reciprocably connected to the driven element, and a first member at least partially surrounding the driven element and having a cam track cooperating with the cam follower so as to reciprocate the driven element upon oscillation of the first member.

10. A clutch as claimed in claim 9, comprising a stop means which is operative when the driven element is retracted from the driving element to stop the driven element in a predetermined angular position.

11. A clutch as claimed in claim 10, wherein the stop means comprises a first, fixedly mounted stop member and a second stop member mounted on the driven element, the two stop members being so constructed and arranged that they clear each other when the driven element is shifted into engagement with the driver element and that the first stop member lies in the path of the second stop member when the driven element is shifted out of engagement with the driver element.

12. A clutch as claimed in claim 9, wherein the clutch-releasing means comprises a second member substantially non-rotatably and reciprocably connected to the first member and having teeth adapted to mesh with the teeth on the driver element, said second member having a cam surface cooperating with the cam follower, when the teeth on the second member have been engaged with the teeth on the driver element and the driven element has been disengaged from the driver element, to retract the second member from engagement with the driver element.

13. A definite-position release type clutch, comprising a support, a toothed driver element and a toothed driven element coaxial therewith rotatably mounted on the support, said driven element being adapted to be selectively shifted into and out of meshing engagement with the driver element, means rotatably and non-reciprocably connected to the driven element, for shifting it longitudinally, an inner sleeve coaxial of the driven element and surrounding it and the shifting means, an outer sleeve surrounding the inner sleeve and located between it and a portion of the support, the inner and outer sleeves being keyed together so as to allow their joint rotation and to permit relative axial movement between them, the inner sleeve having teeth on the edge thereof confronting the driver element, such teeth being adapted selectively to mesh with the teeth on the driver element and to be disengaged therefrom, at least one pin projecting radially outwardly from the shifting means through a window in the inner sleeve, through a cam slot in the outer sleeve, and into a generally longitudinally extending slot in the support, the outer sleeve being rotatable thereby to reciprocate the driven element into and out of mesh with the driver element, and means selectively to shift the inner sleeve longitudinally independently of the outer sleeve to cause the teeth on the inner sleeve to mesh with the teeth on the driver element, the parts being so constructed and arranged that, when the teeth on the inner sleeve are thus in mesh with those on the driver element, continued rotation of the driver element causes the inner and outer sleeves to rotate therewith for a part of a revolution thereby to disengage the driven element from the driver element and thereafter, in a later part of the same revolution, to cause the pins to retract the inner sleeve so as to cause the teeth on the inner sleeve to be disengaged from those on the driver element.

14. A definite-position release type clutch, comprising a housing, a toothed driver element and a toothed driven element coaxial therewith rotatably supported in the housing, said driven element being adapted to be selectively shifted into and out of meshing engagement with the driver element, a shifting collar rotatably connected to the driven element, an inner sleeve mounted in the housing coaxially of the driven element and surrounding it and the collar, an outer sleeve surrounding the inner sleeve and located between it and the housing, the inner and outer sleeves being keyed together so as to allow their joint rotation and to permit relative axial movement between them, the inner sleeve having teeth on the edge thereof confronting the driver element, such teeth being adapted selectively to mesh with the teeth on the driver element and to be disengaged therefrom, at least one pin projecting radially outwardly from the shifting collar through a window in the inner sleeve, through a cam slot in the outer sleeve, and into a generally longitudinally extending slot in the wall of the housing, manually operated means to rotate the outer sleeve thereby to reciprocate the driven element into and out of mesh with the driving element, and means selectively to shift the inner sleeve longitudinally independently of the outer sleeve to cause the teeth on the inner sleeve to mesh with the teeth on the driver element, the parts being so constructed and arranged that, when the teeth on the inner sleeve are thus in mesh with those on the driver element, continued rotation of the driver element causes the inner and outer sleeves to rotate therewith for a part of a revolution thereby to disengage the driven element from the driver element and thereafter, in a later part of the same revolution, to cause the pins to retract the inner sleeve so as to cause the teeth on the inner sleeve to be disengaged from those on the driver element.

15. A clutch as claimed in claim 14, wherein the cam slot in the outer sleeve has a first portion located generally in a transverse plane normal to the axis of the sleeve and a second portion connected to an end of the first portion, said second portion being inclined somewhat toward the driver element, and the window in the inner sleeve at least partially underlies the cam slot at all times, the corner of the window generally underlying the first position of the cam slot being inclined toward the driver element in the direction opposite the second portion of the cam slot.

16. A clutch as claimed in claim 15, wherein the parts are so constructed and arranged that, when the inner sleeve has its teeth in meshing engagement with the teeth on the driver element and the driven element is disengaged from the driver element, the pin lies generally at the junction between the first and second portions of the cam slot and intermediate the peripheral width of the window and generally at the entering end of the inclined corner of such window.

17. A definite-position release type clutch, comprising a support, a toothed driver element and a toothed driven element coaxial therewith rotatably mounted on the support, said driven element being adapted to be selectively shifted into and out of meshing engagement with the driver element, means rotatably and non-reciprocably connected to the driven element for shifting it longitudinally, an inner sleeve coaxial of the driven element and surrounding it and the shifting means, an outer sleeve surrounding the inner sleeve and located between it and a portion of the support, the inner and outer sleeves being keyed together so as to allow their joint rotation and to permit relative axial movement between them, the inner sleeve having teeth on the edge thereof confronting the driver element, such teeth being adapted selectively to mesh with the teeth on the driver element and to be disengaged therefrom, at least one pin projecting radially outwardly from the shifting means through a window in the inner sleeve, through a cam slot in the outer sleeve, and into a generally longitudinally extending slot in the support, the outer sleeve being rotatable thereby to reciprocate the driven element into and out of mesh with the driver element, means selectively to shift the inner sleeve longitudinally independently of the outer sleeve to cause the teeth on the inner sleeve to mesh with the teeth on the driver element, the parts being so constructed and arranged that, when the teeth on the inner sleeve are thus in mesh with those on the driver element, continued rotation of the driver element causes the inner and outer sleeves to rotate therewith for a part of a revolution thereby to disengage the driven element from the driver element and thereafter, in a later part of the same revolution, to cause the pins to retract the inner sleeve so as to cause the teeth on the inner sleeve to be disengaged from those on the driver element, and power-storing means into which power is fed during the clutch-releasing operation and which, when released, rotates the outer sleeve to shift the driven element into engagement with the driver element.

18. A definite-position release type clutch, comprising: a toothed driver element, a toothed driven element coaxial of the driver element and adapted to be selectively shifted into and out of meshing engagement with the driver element, means for shifting the driven element into engagement with the driver element, and clutch-releasing means comprising a rotatable toothed sleeve member mounted coaxially of and telescopically with respect to the driven element, said sleeve member being reciprocable along its axis of rotation so that its teeth are selectively drivingly engageable with the teeth of the driver element, and means driven by the toothed sleeve member to shift the driven element out of meshing engagement with the driver element.

References Cited in the file of this patent
UNITED STATES PATENTS

| | | |
|---|---|---|
| 551,690 | Penfield et al. | Dec. 17, 1895 |
| 1,116,385 | Gasgrain | Nov. 10, 1914 |
| 2,142,257 | Saeta | Jan. 3, 1939 |
| 2,388,407 | Hansen | Nov. 6, 1945 |
| 2,796,856 | Gratzmuller | June 25, 1957 |